Patented Apr. 22, 1941

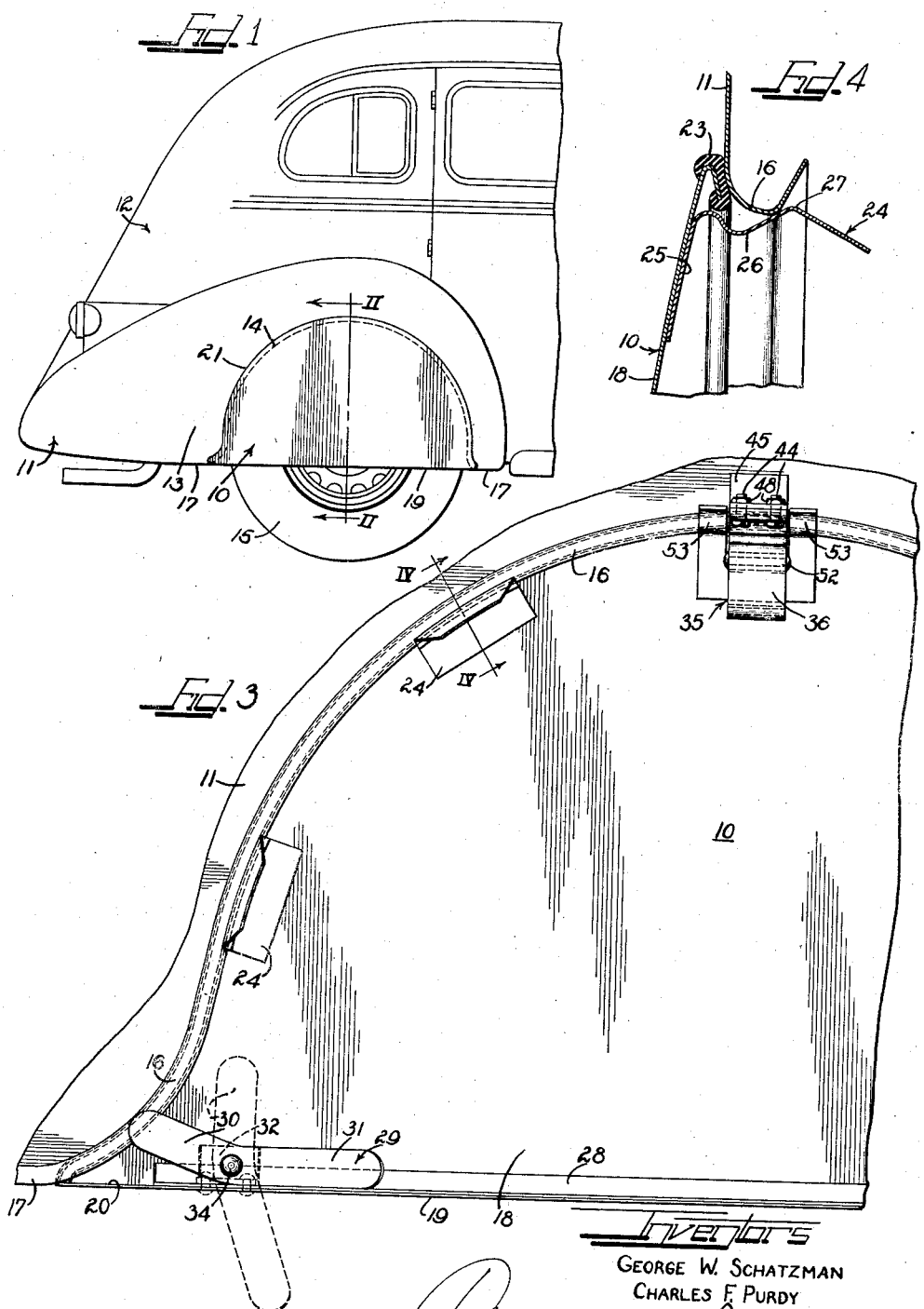

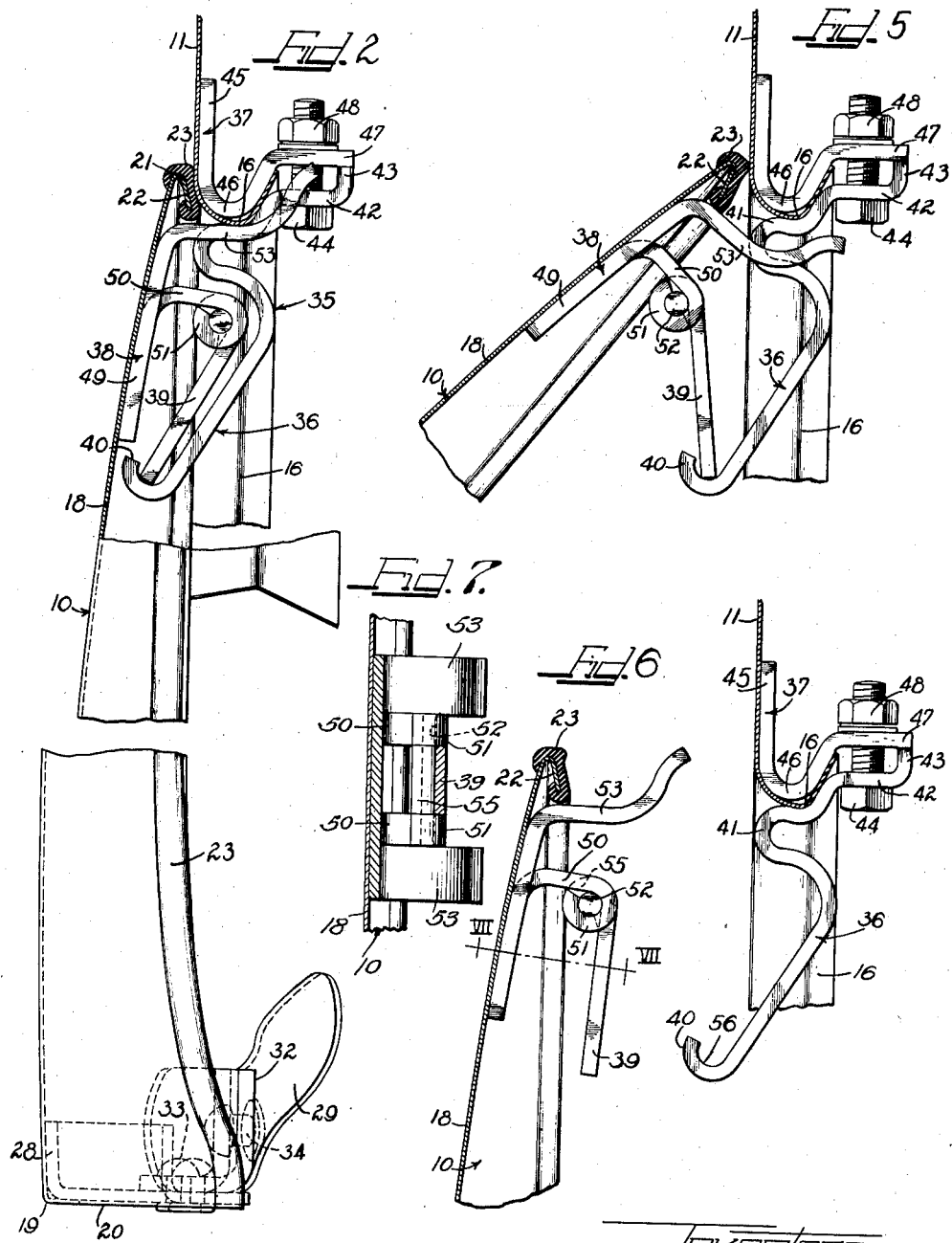

2,239,373

UNITED STATES PATENT OFFICE 2,239,373

FENDER WHEEL HOUSING ASSEMBLY

George W. Schatzman and Charles F. Purdy, Detroit, Mich., assignors, by mesne assignments, to Houdaille-Hershey Corporation, Detroit, Mich., a corporation of Michigan Application May 28, 1938, Serial No. 210,550

7 Claims. (Cl. 16—172)

This invention relates to a fender wheel housing assembly, and more particularly to a novel means for supporting and securing an ornamental fender skirt or fender wheel housing to a vehicle fender.

In designing ornamental fender wheel housings or fender skirts of the type which are adapted to cover the usual wheel access opening in a vehicle fender, it is important that the means which are employed to support and secure the fender skirt in desired position be of such a character as to facilitate the assembly and removal of the fender skirt from the vehicle fender. It has also been found desirable to provide a support and mounting for the fender skirt which is of the over-center linkage type, but in which one portion of the linkage mechanism may be lifted away from the other portion after the fender skirt has been swung partially away from the fender. The assembly and mounting must also possess a high degree of ruggedness when in use and be substantially free from vibration and noise.

It is an object of this invention to provide a novel fender wheel housing assembly comprising a novel ornamental fender skirt and fender skirt mounting which possesses the above highly desirable characteristics.

It is another object of this invention to provide an improved fender skirt and fender skirt mounting which is economical to manufacture, and which is rugged and reliable in use.

It is a further object of this invention to provide novel means for supporting the fender skirt and for urging the fender skirt upwardly in the plane of the fender opening.

Another and further object of this invention is to provide a novel fender skirt mounting which can be completely detached from the vehicle fender when desired, but which permits a partial removal of the mounting means together with the fender skirt when desired to permit access to the wheel.

Another and still further object of this invention is to provide a novel multiple-hinged fender skirt mounting.

The novel features which I believe to be characteristic of my invention are set forth with particularity in the appended claims. My invention itself, however, both as to its organization and manner of construction, together with further objects and advantages thereof, may best be understood by reference to the following description taken in connection with the accompanying drawings, in which:

Figure 1 is a side elevational view of the rear part of an automobile having the usual form of vehicle fender and equipped with an ornamental fender skirt and fender skirt mounting constructed in accordance with the teachings of the present invention;

Figure 2 is a side elevational view partly in cross section taken along the line II—II of Figure 1;

Figure 3 is a fragmentary rear elevational view of a part of the fender skirt and the fender skirt mounting;

Figure 4 is a fragmentary side elevational view in cross section of the edge of the fender skirt taken along the line IV—IV of Figure 3;

Figure 5 is an elevational view of the fender skirt mounting as shown in Figure 2, but with the hinge mechanism of the mounting in a partially open position, and with the fender skirt partially rotated out of its mounted position on the vehicle fender;

Figure 6 is a view similar to Figure 5, but with the hinge mechanism of the fender skirt mounting broken apart and with the fender skirt completely removed from the vehicle fender; and Figure 7 is a view of the under side of the pivot construction as viewed along the line VII—VII of Figure 6.

In Figure 1 of the drawings, I have illustrated a fender skirt 10 constructed in accordance with the teachings of the present invention assembled on a rear fender 11 of an automobile 12. The fender 11 is shown as being of the high crown type, having a downwardly extending outer side wall portion 13, the latter being provided with the usual opening 14 which affords access to the vehicle wheel 15, and which permits ready removal of the wheel 15 in an axial direction. The ornamental fender skirt 10 is disposed over the opening 14 in such a manner as to substantially close the opening and to form a housing therewith for the wheel 15. The fender skirt 10 is preferably designed to harmonize with the outer side wall portion 13 of the fender 11 and form substantially a continuation thereof. The outer surface of the fender skirt 10 may, of course, be substantially smooth, as is illustrated in the drawings, or it may assume any other desired configuration for the purpose of ornamentation.

The outer marginal edge of the fender 11 which defines the opening 14 is underturned as at 16 (see Figure 4), while the outer marginal edges that define the base of the fender are underturned in a similar manner to define the lower or base edges 17 (see Figure 1). As is well known to those skilled in the art, fenders of the high crown type are generally provided with these underturned edge portions to increase the rigidity of the fender. As will presently be understood, the underturned edge 16 forms a convenient attaching portion for securing the fender skirt mounting on the fender 11.

The fender skirt 10 includes a principal part or panel 18 which extends entirely across the wheel opening 14 and slightly overlaps the marginal edge of the vehicle fender 11. This panel portion 18 terminates in a substantially straight lower edge portion 19, which is bent at substantially a right angle to panel portion 18 and extends rearwardly to form a base flange 20 (as may be seen best in Figure 2 of the drawings). The curved edge 21 of the panel 18 of the fender skirt 10 is inturned as at 22, and preferably a cushioning strip 23 of some suitable resilient or yieldable material such as rubber is secured over this inturned portion 22 to prevent a direct metal to metal contact between the curved edge 21 of fender skirt 10 and the vehicle fender 11. At spaced points about the curved edge 21 of fender skirt 10 are a plurality of fastening fingers 24. These fastening fingers 24 are preferably formed of resilient steel stock and include a leg portion 25 which is welded or otherwise secured to the rear face of the fender skirt 10 immediately below the inturned portion 22. The fingers 24 also include a laterally or axially rearwardly extending free leg portion 26 which includes a hump-shaped portion 27. The hump-shaped portion 27 of the leg 26 is adapted to be cammed under edge 16 of the fender 11 and extend into engagement with the rear portion of the underturned edge 16 to restrain lateral movement of the fender skirt with respect to the vehicle fender.

In order to further reduce noise and vibration in the fender skirt mounting, a reinforcing angle bar or strip 28 is welded or otherwise suitably secured to the base flange 20. This stiffens the lower portion of the fender skirt 10 and reinforces that portion of the fender skirt 10 which is not lying in direct abutting relationship with a portion of the vehicle fender 11.

Lateral locking bars 29 are provided on the fender skirt 10 in addition to the spring fingers 24 for preventing lateral movement of the fender skirt 10 with respect to the vehicle fender 11. These lateral locking bars 29, as may be seen best in Figure 3, are angled to form a locking fender engaging portion 30 and a handle portion 31, and are mounted at the two lower corners of the fender skirt 10 on a bracket 32, which is riveted or otherwise suitably secured to the reinforcing bar 28 as at 33. The locking bar 29 is supported on the upstanding portion of the bracket 32 by means of a rivet or other suitable pin connection 34, which permits rocking movement of the locking bar 29 into and out of engagement with the underturned edge 16 of the fender 11. As will presently be more fully understood, the locking bars 29 provide a tight engagement of the fender skirt 10 with the vehicle fender insofar as lateral movement is concerned, while the resilient fingers 24 are more for the purpose of temporarily securing the fender skirt in position with respect to lateral displacement pending the movement of the locking bars 29 into locking engagement.

To secure and mount the fender skirt 10 on the vehicle fender 11 and provide the necessary vertical support for the fender skirt, a multiple hinge fender skirt mounting 35 is provided. The fender skirt mounting 35 comprises the sole vertical support for the fender skirt 10 and also permits the fender skirt 10 to be swung partially outwardly and upwardly away from the opening 14 in the fender 11 prior to the complete removal of the fender skirt 10 therefrom.

More particularly, the multiple hinge mounting 35 includes a hook member 36, a clamp member 37, a hinge member 38, and an intermediate hinge arm 39. The exact configuration of the principal component parts of the multiple hinge mounting 35 may best be understood from an examination of Figures 3 and 6. The hook member 36 is designed to be detachably held on the fender 11 by the clamp member 37, but it is to be understood that this hook member 36 and clamp member 37 normally remain permanently fastened to the fender 11 as long as the fender skirt 10 is being employed on the vehicle. That is to say, when the fender skirt 10 is temporarily removed to permit access to the wheel 15, the clamp member 36 remains fastened to the fender 11. If, however, the fender skirt 10 is permanently removed for one reason or another, the clamp member 36 may be quickly and readily removed from the fender 11.

More specifically, the hook member 36 includes a lower upturned portion 40 which is arranged to receive and seat the free end of the intermediate hinge arm 39. The intermediate portion of the hook member 36 is folded as at 41, the upper portion of the fold being arranged to snugly fit the underturned edge 16 of the fender 11. The upper portion of the hook member 36 extends rearwardly as at 42 and then upwardly as at 43, the rearwardly extending portion 42 being apertured for the reception of a clamping bolt 44.

The clamp member 37 has a tail portion 45 which is arranged to fit snugly against the rear face of fender 11. The intermediate portion of the clamp member 37 is curved as at 46 to substantially fill the channel provided by the underturned edge 16 and to reinforce the same at the point where the multiple hinge mounting 35 is being secured to the fender 11. The clamp member 37 also includes a rearwardly extending lip 47 which is apertured for the reception of the clamping bolt 44. As will readily be seen from a cursory examination of the drawings, the hook member 36 is mounted on the fender 11 by passing the clamping bolt 44 through the aperture in portion 42 thereof and through the complementary aperture in the lip 47 of the clamp member 37. A suitable nut 48 is provided to be threaded on the threaded end portion of the clamping bolt 44. As the clamping bolt 44 is tightened, the hook member 36 is pulled up tightly against the underturned edge 16 of fender 11, the tail portion 45 being positioned to prevent the assembly from rolling out of engagement with the fender edge.

The hinge member 38 includes a base portion 49 which is spot welded or otherwise suitably secured to the rear face of fender skirt 10 immediately below the inturned edge portion thereof. Extending rearwardly from the base portion 49 is a hinge arm 50 which terminates in a pair of spaced curled ears 51 which carry a hinge pin 52 in the convention manner. The hinge member 38 also includes a pair of elongated ears 53, which extend rearwardly and upwardly as is clearly shown in Figures 2 to 6 of the drawings. These ears 53 are specifically arranged to extend beneath the underturned edge 16 of the fender 11, and then upwardly therebehind. The ears 53, as will presently be fully understood, serve as a safety precaution against accidental disengagement while the hinge member urges the fender skirt into tight contact around its peripheral edges.

Hinged to the hinge arm 50 of the hinge member 38 is an intermediate hinge arm 39, one end of which is curled about the hinge pin 52, as at 55 to form the desired hinge connection between hinge arms 50 and 39. The opposite end of the intermediate hinge arm 39 is arranged to extend into the pocket 56 formed by the upturned end 40 of the hook member 36.

As will best be understood from an inspection of Figure 2, the hinge arm 39 is in an overcenter position when the fender skirt 10 is in its mounted position on fender 11. This overcenter position of the intermediate hinge arm 39 thus tends to prevent lateral outward movement of the upper portion of the vehicle fender 10 as well as to vertically support it in the opening 14 of the fender 11.

To mount the fender skirt 10 on the fender 11, the fender skirt is moved up into the position shown in Figure 6 of the drawings. Thereafter, the intermediate hinge arm 39 is seated in the pocket 56 formed by the upturned end 40 of the hook member 36. At the same time, the elongated ears 53 are passed beneath the underturned edge 16 of the fender 11. At this time the fender skirt and the various component parts of the multiple hinge mounting are in the position as shown in Figure 5 of the drawing. The fender skirt 10 is now given a downward and inward push (i. e., is moved in a counter-clockwise direction as viewed in Figures 2, 5 and 6 of the drawings), the cushion member 23 acting as a pivot point at the top of the fender skirt 10. As the fender skirt 10 is moved downwardly and inwardly, the spring fingers 24 are snapped under the under-turned edge 16 of the fender 11, with the hump portion 27 thereof engaging the rear side of the underturned edge 16. At the same time as the spring fingers 24 are passing under the under-turned edge 16 of fender 11, the hinge pin 52 is causing the intermediate hinge arm 39 to pass through an overcenter position thereby firmly supporting the fender skirt 10 on the fender 11 and at the same time tending to prevent outward lateral displacement of the top of the fender skirt 10 with respect to the fender 11. The final step of the mounting operation is to move the locking bars 29 from their inactive position, as shown by the dotted line in Figure 3, to a locking position, as shown by the full lines in Figure 3. The fender skirt 10 is now tightly secured and supported on the fender 11, and thereby forms a substantially complete housing for the upper portion of the wheel 15 of the vehicle 12.

To temporarily remove the fender skirt 10, it is simply necessary to reverse the operations described above. Specifically, the locking bars 29 are sprung outwardly away from the lower edge 20 of the fender skirt 10 so that the handle portion 31 can move downwardly therepast to free the locking portion 30 from the underturned edge 16 of the fender 11. The fender skirt 10 is then given a sharp outwardly and upwardly pull, thereby causing the multiple hinge mounting to throw past the overcenter position of the intermediate hinge arm 39 to free the same from the hook supporting member 36. The fender skirt 10 may then be lifted off of the hook member 36 and laid to one side pending the time when it is again to be mounted on the fender 11. If for any reason it is desired to permanently remove the fender skirt 10, or to remove it for a relatively long period of time, the nut 48 is removed from the clamping bolt 44, and a hook member 36 is lifted off of the fender 11. The clamp member 37 may then be lifted off of the rear face of fender 11, thus completely removing the fender skirt mounting mechanism therefrom.

While I have shown a particular embodiment of my invention, it will, of course, be understood that I do not wish to be limited thereto, since many modifications may be made, and I therefore contemplate by the appended claims to cover all such modifications as fall within the true spirit and scope of my invention.

I claim as my invention:

1. A fender skirt mounting for supporting and securing a fender skirt in desired position on a vehicle fender over the wheel opening thereof, comprising a split link mechanism having two end arms and an intermediate link arm hinged to one of said end arms and freely supported for rocking movement by the other of said end arms, one of said end arms being secured to said fender and being in a substantially fixed position with respect thereto and the other of said end arms being secured to said fender skirt and being in a substantially fixed position with respect thereto.

2. A fender skirt mounting for supporting and securing a fender skirt in desired position on a vehicle fender over the wheel opening thereof, comprising a split link mechanism having two end arms and an intermediate link arm hinged to one of said end arms and freely supported for rocking movement by the other of said end arms, one of said end arms being secured to said fender and in fixed position with respect thereto and the other of said end arms being secured to said fender skirt and in fixed position with respect thereto, the pivot point of the intermediate link arm adjacent said fender skirt being arranged to snap overcenter with respect to the pivot point provided by the freely supporting engagement of the opposite end of said intermediate link arm with said other of said end arms and the point of engagement of the fender skirt with the fender.

3. A fender skirt mounting for supporting and securing a fender skirt in desired position on a vehicle fender over the wheel opening thereof, comprising an overcenter toggle mechanism having two end arms and an intermediate link arm, one of said end arms being shaped to provide a seat for said intermediate link arm upon which said intermediate arm is freely disposed, and the other of said arms being hinged to said intermediate link arm, said end arms being secured in fixed position on said skirt and fender respectively, and means for limiting the overcenter movement of said toggle mechanism.

4. A fender skirt mounting for supporting and securing a fender skirt in desired position on a vehicle fender over the wheel opening thereof, comprising a split link overcenter toggle mechanism secured at one end to said fender skirt and at the other end to said fender, said toggle mechanism including a rearwardly extending hinge arm rigidly secured to said fender skirt, an intermediate link arm hinged to said hinge arm and extending generally downwardly, and a hook arm carried by said fender and rigidly secured thereto having an upturned lower end providing a seat for the lower end of said intermediate link arm.

5. A fender skirt mounting for supporting and securing a fender skirt in desired position on a vehicle fender over the wheel opening thereof, comprising a split link overcenter toggle mechanism secured at one end to said fender skirt and at the other end to said fender, said toggle mechanism including a rearwardly extending hinge arm rigidly secured to said fender skirt, an intermediate link arm hinged to said hinge arm and extending generally downwardly, and a hook arm rigidly carried by said fender having an upturned lower end providing a seat for the lower end of said intermediate link arm, the pivot point of said hinge connection between said intermediate link arm and said hinge arm being arranged to snap rearwardly through the vertical plane of said upturned end of said hook arm taken parallel to the front face of said fender.

6. A fender skirt mounting for supporting and securing a fender skirt in desired position on a vehicle fender over the wheel opening thereof, comprising a plate member secured to the rear face of said fender skirt in proximity to the top edge thereof, said plate member including a rearwardly extending link supporting arm and at least one safety finger extending rearwardly beneath the opening defining edge of said fender and then upwardly behind said opening defining edge, an intermediate link arm pivotally connected to said rearwardly extending link supporting arm, and a hook member secured to and carried by said fender having a folded portion seated on the opening defining edge of said fender and having a lower portion extending downwardly and forwardly at an oblique angle and terminating in an upturned lower end, said upturned lower end of said hook member providing a channel shaped seat in which the free end of said intermediate link arm is carried.

7. A mounting for supporting and securing a closure member in closed position on a depending wall member over an opening therein, said mounting comprising a supporting part carried on one member and a connecting part rotatably carried on the other member and separably connected to said supporting part for rotational movement thereon, said connecting part being swung upwardly and inwardly into overlapping relationship with said supporting part by movement of said closure to closed position, retaining means on said closure member for engagement with said wall member, said retaining means being urged upwardly against said wall member as said connecting part is swung into overlapping engagement with said supporting part.

GEORGE W. SCHATZMAN.
CHARLES F. PURDY.